United States Patent
Osborne et al.

(10) Patent No.: US 6,272,398 B1
(45) Date of Patent: Aug. 7, 2001

(54) PROCESSOR-BASED PROCESS CONTROL SYSTEM WITH INTUITIVE PROGRAMMING CAPABILITIES

(75) Inventors: Richard D. Osborne; Mark W. Spicer, both of Ankeny; Berton G. Whited, Des Moines, all of IA (US)

(73) Assignee: Siebolt Hettinga, Des Moines, IA (US)

( * ) Notice: Subject to any disclaimer, the term of this patent is extended or adjusted under 35 U.S.C. 154(b) by 0 days.

(21) Appl. No.: 09/157,731

(22) Filed: Sep. 21, 1998

(51) Int. Cl.⁷ .................................................. G06F 19/00
(52) U.S. Cl. ............................ 700/245; 700/9; 700/118; 700/200; 700/203; 264/40.6; 264/40.1; 709/218
(58) Field of Search ................................ 700/18, 7, 200, 700/9, 130, 140, 84, 197, 203, 121, 118, 213; 264/40.6, 40.1; 709/218

(56) References Cited

U.S. PATENT DOCUMENTS

| | | | |
|---|---|---|---|
| 4,835,699 | 5/1989 | Mallard | 700/140 |
| 5,062,052 * | 10/1991 | Sparer et al. | 700/197 |
| 5,316,707 | 5/1994 | Stanciu et al. | 264/40.1 |
| 5,386,517 | 1/1995 | Sheth et al. | 710/60 |
| 5,517,404 | 5/1996 | Biber et al. | 700/9 |
| 5,518,671 * | 5/1996 | Takizawa et al. | 264/40.1 |
| 5,539,650 | 7/1996 | Hehl | 700/200 |
| 5,553,297 | 9/1996 | Yonezawa et al. | 700/18 |
| 5,581,764 * | 12/1996 | Fitzgerald et al. | 717/3 |
| 5,609,663 | 3/1997 | Nguyen et al. | 65/160 |
| 5,682,476 | 10/1997 | Tapperson et al. | 370/225 |
| 5,705,201 * | 1/1998 | Ibar | 425/130 |
| 5,706,453 | 1/1998 | Cheng et al. | 345/347 |
| 5,734,905 | 3/1998 | Oppenheim | 709/315 |
| 5,764,891 | 6/1998 | Warrior | 710/72 |
| 5,773,038 * | 6/1998 | Hettinga | 425/145 |
| 5,784,583 | 7/1998 | Redpath | 345/353 |
| 5,913,033 * | 6/1999 | Grout | 709/219 |
| 5,920,696 * | 7/1999 | Brandt et al. | 709/218 |
| 5,995,878 * | 11/1999 | Miyaima | 700/121 |
| 6,020,893 * | 2/2000 | Freeman | 345/428 |
| 6,052,454 * | 3/2000 | Kek et al. | 379/188 |
| 6,072,860 * | 6/2000 | Kek et al. | 379/88.25 |
| 6,192,283 * | 2/2001 | Holowko | 700/28 |

OTHER PUBLICATIONS

Lu et al., Multivariable self–tuning temperature control for plastic injection molding process, 1995, IEEE, pp. 702–709.*

Seaman et al., A multiobjective optimization approach to quality control with application to plastic injection molding, 1993, IEEE, pp. 414–426.*

Tseng et al., Knowledge–Based Mold Design For Injection Molding Processing, IEEE., pp. 11991204, 1990.*

Turng et al., a Knowledge Base System For The Design And Manufacture Of Injection–Molded Plastic Products, IEEE., pp. 95–98, 1998.*

Giancola, Expert Response Compensation For Injection Process Controls, IEEE., pp. 21–23, 1991.*

(List continued on next page.)

*Primary Examiner*—William A. Cuchlinski, Jr.
*Assistant Examiner*—McDieunel Marc
(74) *Attorney, Agent, or Firm*—Brian J. Laurenzo; Michael C. Gilchrist (57) ABSTRACT

A system having a processor-based process control system for a plastic injection molding machine performing a plastic injection molding process having an I/O bus network containing a plurality of I/O modules operably connected to a corresponding I/O device associated with the plastic injection molding machine and a first computer having and I/O bus controller directly connected to the I/O bus network, a real-time operating system, and a first processor executing a plastic injection molding control program for controlling the plastic injection molding process.

12 Claims, 7 Drawing Sheets

OTHER PUBLICATIONS

Hettinga Programmable Slave User Interface Overview, 13 pages.

InterBus–S Sensor/Actuator Network, Bulletin 0275A, May 1995, Phoenix Contact Inc.

Understanding Device Level Buses, A Tutorial, by Bob Svacina, 1996, Turck Inc., 21 pages.

Device–Level Networks and Reasons to Love Them, Control Design, by Bill Arnold and Rick Johnson, Feb. 1998, 5 pages.

"More big factories bid good–bye to proprietary connections," *Machine Design*, A Penton Publication Periodical, Jul. 9, 1998, pp. 71–76.

A New Beginning for Plastics Controls, Vickers Electronic Systems, 4 pages.

* cited by examiner

PROCESSOR-BASED PROCESS CONTROL SYSTEM WITH INTUITIVE PROGRAMMING CAPABILITIES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

1. FIELD OF THE INVENTION

The present invention relates to process control systems. More particularly, the present invention relates to processor-based process control systems. Specifically, the present invention relates to processor-based control systems with intuitive programming capabilities.

2. BACKGROUND OF THE INVENTION

In the plastics industry, as well as in other industries, industrial processes performed by machines are typically controlled by programmable logic controller (PLC)-based control systems. These PLC-based control systems are typically comprised of a plurality of input/output (I/O) devices integrated with the machine performing the process, a PLC, one or more specialized I/O control boards, and a general purpose digital processor. The PLC stores and executes a control program that causes the PLC to issue commands to the I/O devices thereby controlling the operational sequence of the machine process. Some of the commands issued by the PLC are issued through the specialized I/O control boards. The general purpose digital computer provides an interface between a human operator and the control program being executed by the PLC. The general purpose digital computer may receive process parameters and other information from the PLC and present such information for viewing by the human operator. Similarly, the human operator may use I/O devices (such as a keyboard or a mouse) associated with the general purpose digital computer to input process parameters and other information relating to the controlled process into the PLC. This type of PLC-based process control system is disclosed in U.S. Pat. No. 5,316,707, U.S. Pat. No. 5,518,671 and U.S. Pat. No. 5,062,052.

One drawback of PLC-based control systems is the relatively limited processing power of PLCs. PLCs are clocked at relatively low speeds. This limited processing power of PLCs may prevent a PLC controlled machine from performing a process at optimal speeds and/or at optimal quality and efficiency.

The limited processing power of PLCs may also require that the monitoring and control of some I/O devices on the machine be performed by additional and specialized I/O control boards. For example, in the plastic injection molding process, certain process temperatures are particularly important and sensitive parameters of the process. Relatively small changes in temperature in relatively small periods of time must be detected and appropriate control commands issued on a real-time basis. However, a typical PLC cannot perform this function at the same time that the PLC is performing other functions. Thus, a specialized I/O control board that operates as a real-time signal processor must be operably connected between the temperature I/O device and the PLC. The addition of this specialized I/O control board to the PLC-based control system increases the cost of the system and the chances for system failure.

The limited processing power of PLCs also makes them an ineffective means for providing a human operator interface to the control program. Rather, PLC-based process control systems require a general purpose digital computer operably connected to the PLC for this purpose. This dual hardware requirement may result in relatively large cost expenditures associated with the purchase, installation and maintenance of PLC-based process control systems. Utilizing both of these hardware components in a process control system also increases the chances for system failure.

Yet another drawback of PLC-based control systems is that the PLC technology is usually proprietary technology of the process control system manufacturer. Consequently, with respect to technology upgrades, operators and other end-users of the PLC-based control systems are at the mercy of process control system manufacturers.

Yet another drawback of PLC-based control systems is that the process control program is typically written in a relatively complex low-level language, such as ladder logic. However, purchasers and other end users of process control systems are rarely trained in the art of low-level programming. Thus, when a purchaser or other end user of a process control system wishes to write a new process control program or to modify an existing process control program, a trained low-level language programmer must usually be retained or consulted. However, given the complexity of low-level languages and the fact that a typical low-level language command has only a basic, minimal functionality within a program, even a trained programmer may be required to write and/or edit large amounts of control program code to make even minor modifications to the control program. This may result in significant cost expenditures as well as significant downtime for the process control system and the machine.

Yet another drawback of PLC-based control systems is that, due to the proprietary nature of such systems, PLC-based control systems cannot be operably connected to conventional computer networks.

Thus there exists a need in the art for process control systems comprising fewer hardware components and greater processing power. Furthermore, there exists a need in the art for readily upgradeable process control systems that may be operably connected to conventional computer networks. Furthermore, there exists a need in the art for process control systems that may be relatively simply and intuitively programmed by individuals unfamiliar with low-level programming languages (e.g., purchasers and other end users of process control systems).

3. SUMMARY OF THE INVENTION

The invention comprises a processor-based process control system for a plastic injection molding machine performing a plastic injection molding process comprising an I/O bus network having a plurality of I/O modules operably connected to a corresponding I/O device associated with the plastic injection molding machine and a first computer comprising an I/O bus controller directly connected to the I/O bus network, a real-time operating system, and a first processor executing a plastic injection molding control program for controlling the plastic injection molding process. The invention may also comprise an application-specific program configured to operate with the plastic injection molding control program wherein the application-specific program provides a GUI comprising at least one window for viewing parameters related to the plastic injection molding process and wherein the application-specific program provides a GUI comprising at least one window for inputting information related to the plastic injection molding process. The invention may also comprise a program for creating the plastic injection molding control program, comprising a hierarchy of programming levels, including an N programming level and an N+1 programming level, wherein N is a positive integer, a defined set of N programming level commands, and a GUI window for defining N+1 programming level commands by enabling a user to select and arrange a plurality of defined N programming level commands.

4. BRIEF DESCRIPTION OF THE DRAWINGS

For a more complete understanding of the present invention, and the advantages thereof, reference is now made to the following description taken in conjunction with the accompanying drawings, in which.

5. DETAILED DESCRIPTION OF THE INVENTION 5.1 Apparatus Comprising One Embodiment Of The Present Invention In FIG. 1, there is shown a schematic diagram of a processor-based process control system 10 according to the present invention.

5.1.1 Machine

Figure 1:
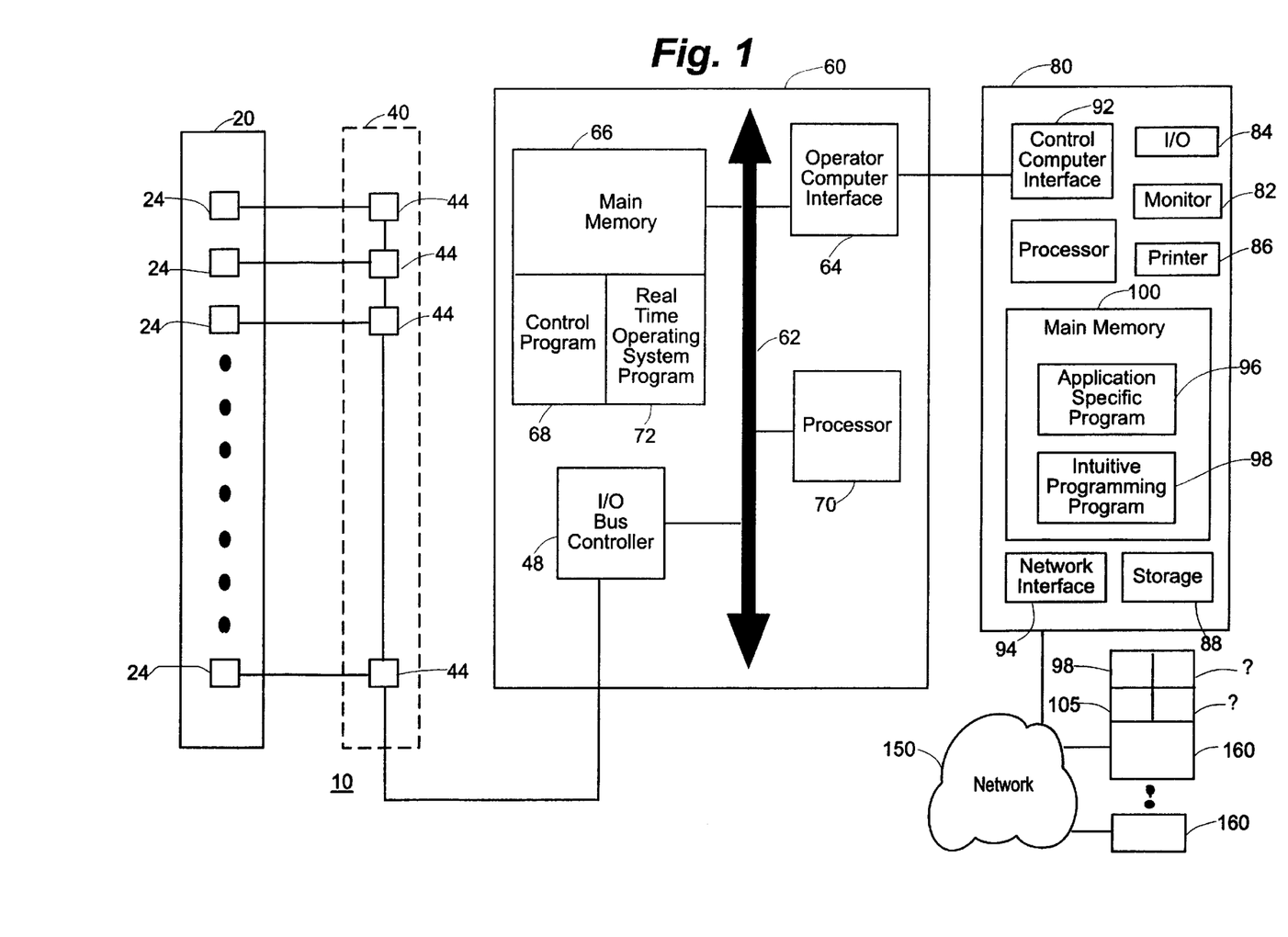
FIG. 1 is a schematic diagram of a processor-based process control system according to the present invention.

As shown in FIG. 1, the process control system 10 may control the operational sequence of a process performed by a machine 20. In one embodiment of the present invention, the machine 20 may be a plastic injection molding machine for creating a variety of plastic products. Such a plastic injection molding machine is disclosed in U.S. Pat. No. 5,773,038 which is hereby incorporated by reference.

The machine 20 may comprise as a plurality of machine elements or components such as pistons, clamps, valves, solenoids, thermocouples, gauges, actuators, sensors, switches or other conventional input/output (I/O) devices (collectively designated as 24). In performing the desired process, these I/O devices 24 may be electronically monitored and controlled via analog and digital electronic signals sent to or received from the processor-based process control system 10.

5.1.2 Control Computer

As shown in FIG. 1, the process control system 10 comprises a control computer 60. The control computer 60 comprises a processor 70, a main memory 66, a control program 68 stored in main memory 66, a real-time operating system program 72 stored in main memory 66, an I/O bus controller 48, an operator station interface 64 and a host bus 62. The control computer 60 may also comprise a variety of other conventional computer components (not shown) including monitors, I/O devices, memory subsystems, network interfaces, storage and other logic.

The processor 70 may be any conventional general purpose single- or multi-chip processor such as a Pentium® Pro processor, a Pentium® processor, an 8051 processor, an MIPS® processor, a Power PC® processor, an ALPHA® processor, or an x386, x486, x586 or x686 type processor. The processor 70 may also be any future generation xx86 type processor.

The main memory 66 may be one or more conventional memory devices including, without limitation, dynamic random access memories (DRAMs), extended data out DRAMs (EDO DRAMs), burst extended data out DRAMs (BEDO DRAMs), static random access memories (SRAMs), video random access memories (VRAMs), read-only memories (ROMs), electrically erasable programmable read-only memories (EEPROMs), and erasable programmable read-only memories (EPROMs).

The control computer's operating system program 72, control program 68, and other miscellaneous programs (not shown) are stored in the control computer's main memory 66. The operating system program 72 may be any conventional real-time operating system program, such as MS-DOS or a version of Windows NT or Windows 95 adapted to operate in real-time. The operating system program 72 runs application programs, including the control program 68. The processor 70 and operating system 72 are capable of multitasking.

The control program 68 is executed by the processor 70 to control the machine 20. Because the control program 68 is executed in the processor 70, it may be created using an intuitive programming program 98, described below.

The I/O bus controller 48 controls communications transmitted to the I/O bus network 40 by the processor 70 or the I/O devices 24. The I/O bus controller 48 may be an Interbus-S controller designed by Phoenix Contact Inc. of Harrisburg, Pa. The I/O bus controller 48 is directly operably connected to the I/O bus network 40 (i.e., no other system components are operably connected between the I/O bus controller 48 and the I/O bus network 40).

The operator computer interface 64 comprises logic for controlling communications between an operator computer 80 and the control computer 60. The operator computer interface 64 and the corresponding interface logic 92 in the operator computer 80 may be linked by an RS-485 communications link, Ethernet communications links or other current technologies.

The processor 70, main memory 66, device-level bus controller 48 and operator computer interface 64 are all operably connected to the host bus 62, such that data and commands may be passed between these components of the control computer 60.

The control computer 60 may be physically configured such that it is rack-mountable in, or in close proximity to, the machine 20. The control computer 60 may, for example, be an industrial STD rack-mount computer.

5.1.3 Fieldbus Compatible Network

The process control system 10 also comprises an I/O bus network 40 such as an Interbus-S network designed by Phoenix Contact Inc. or any other Fieldbus compatible network. The I/O bus network 40 may comprise a plurality of I/O modules 44 corresponding to each of the I/O devices 24. As shown in FIG. 1, each I/O device 24 is directly operably connected to a corresponding I/O module 44. As also shown in FIG. 1, the I/O modules 44 are serially connected within the Fieldbus network 40. The I/O bus network 40 is directly operably connected to the I/O bus controller 48 in the control computer 60.

5.1.4 Operator Computer

The operator computer 80 may comprise a processor 90, a main memory 100, an application-specific program 96 loaded in main memory 100, an optionally installed intuitive programming program 98 loaded in main memory 100, a control computer interface 92, a network interface 94, and associated internal or external components, including monitors 82, I/O devices 84 (such as a keyboard and/or mouse), printers 86 and storage 88. All of the components may be operably connected by one or more buses (not shown).

The processor 90 and main memory 100 may be of the types described above for the control computer 60.

The application-specific program 96, an operating system program such as Windows NT or Windows 95 (not shown) and other miscellaneous programs (not shown) are stored in main memory 100 and executed by processor 90. The application-specific program 96 is configured to operate with the control program 68 and is programmed to provide a human operator with the ability to monitor and control the specific process performed by machine 20. For example, when executed, the application-specific program 96 may provide the human operator with a graphical user interface (GUI) comprising a plurality of selectable windows whereby the human operator can change process parameters, issue process commands, and generally monitor and control the operating sequence of the process performed by the machine 20. Thus, the application-specific program 96 is capable of functioning with the control program 68.

An intuitive programming program 98 for creating or editing the control program 68 may also be stored in main memory 100. The intuitive programming program 98 may, however, be stored and executed on another computer. The intuitive programming program 98 may provide an individual untrained in low-level language programming with a GUI comprising a plurality of windows whereby the individual may intuitively create or edit the control program 68. The intuitive programming program 98 is described in greater detail in the Remarks section below.

The control computer interface 92 and the network interface 94 comprise logic for controlling communications between the control computer 60 and a network 150, respectively. Specifically, network interface 94 allows a plurality of other operator computers 160 operably connected to, e.g., a LAN, WAN, internet or intranet, to monitor and control the process performed by the machine 20. The operator computers 160 may be comprised of substantially the same elements as operator computer 80, including the application-specific program 96 and the intuitive programming program 98.

The human operator may view information relating to the process performed by the machine 20, such as real-time process parameters, via monitor 82. The human operator may also input information, such as process parameters, into the operator computer 80 via the I/O devices 84 and monitor 82 (which may be a flat screen monitor or a touch screen monitor). Similarly, the human operator may print process information on printer 86. The human operator may store process information on storage 88. Storage 88 may be a high density storage device comprising more than 120 MB of storage, such as a Superdisk storage system designed by Imation of Oakdale, Minn.

5.2 Operation

In operation, the control program 68, perhaps created by the intuitive programming program 98, is installed in the main memory 66 of the control computer 60. The control program 68 is then executed by processor 70 which causes I/O commands to be sent by the I/O bus controller 48 to the I/O devices 24 via I/O bus network 40. Such I/O commands may, e.g., request information as to the status of a process parameter or command an I/O device 24 to perform a specific function.

Process parameters and other information received by the control computer 60 may be viewed by a human operator when the application-specific program 96 of the operator computer 80 is executed. The human operator may then make decisions regarding the process, and input relevant information into the control system 10 accordingly. Both viewing/monitoring and control functions may be performed in real time. In this manner, the process performed by the machine 20 is monitored and controlled by the processor-based control system 10. The operator computers 80 and/or 160 may also store current and previous control settings in main memory 100 or storage 88 for retrieval when desired.

5.3 Remarks

The processor-based control system 10 described above has several distinct advantages over PLC-based control systems.

5.3.1 Processing Power, Reduction of Control System Hardware and Upgradeability One advantage of the processor-based control system 10 is the relative increase in processing power as compared to PLC-based control systems. The increased speed and ability to perform multitasking operations, allows most, if not all, of the process control to be performed by a single processor 70 executing the control program 68.

The increase in processing power results in a corresponding decrease in the amount of hardware components required in the process control system 10. For example, the processor-based control system 10 does not require specialized I/O boards for relatively sensitive process parameters. Additionally, in some cases, depending upon the physical requirements of the control system 10, the functions of the operator computer 80 may be performed by the control computer 60. For example, the application-specific program 96 may be stored and executed on the control computer 60 concurrently with the control program 68. Monitor 82 and I/O devices 84 may then be associated with the control computer 60 so that a human operator may view and input process parameters into the control system 10 from the same computer 60 that is executing the control program 68. (At least one drawback to this embodiment is that for logistic reasons, it may be desirable to keep the operator computer 80 and control computer 60 physically separate.)

The use of a processor-based control system 10, also allows greater flexibility in periodically upgrading the system technology, including the processor 70. Processor-based technologies do not have the proprietary characteristics of PLCs; thus, upgrades in processor technologies are periodically and widely available.

The use of a processor-based control system, also allows greater flexibility in the monitoring and control of the controlled process. The processor-based control system is compatible with various conventional computer networks, allowing network connected operator stations 160 executing the application-specific software to monitor and control the controlled process.

5.3.2 Creation and Modification of the Control Program

Another advantage of the processor-based control system 10 is the relative ease and flexibility with which the control program 68 may be created or modified. For example, in one embodiment of the present invention, the control program 68 may be created or modified using the intuitive programming program 98 which provides graphical user interfaces that allow for intuitive process control programming. The control program 68 may be created on operator computer 80, operator computer 160 or any other computer (whether the computer is operably connected to machine 20 or a stand-alone computer) that is capable of executing the intuitive programming program 98. When the control program 68 is created and compiled on any of these computers, it is then downloaded by various conventional means to the control computer 60 where it is executed. For example, the control program may be downloaded to the control computer 60 via a direct communications link or the control program may be downloaded to a disk and then inserted into a disk drive associated with the control computer 60 and loaded into main memory 66.

5.3.2.1 Overview of Intuitive Programming Program

In contrast to PLC-based control systems, the present invention contemplates that at least two distinct types of individuals may wish to be involved in the creation and editing of the process control program 68: (1) an individual with knowledge of the process to be controlled (hereinafter referred to as a "Process Programmer") and (2) an individual trained in the art of low-level programming (hereinafter referred to as a "Low-level Programmer"). In many cases, each individual will not be skilled in the others respective field. Accordingly, the intuitive programming program 98 is comprised of a hierarchical system of programming levels wherein programming at each sequentially higher level becomes more intuitive to the Process Programmer and correspondingly less intuitive to the Low-level Programmer. Thus, unlike PLC-based control systems where all programming is performed at a low-level, in the present invention, responsibility for creating or editing the control program 68 may, at some programming level, be given to the Process Programmer.

Figure 2:
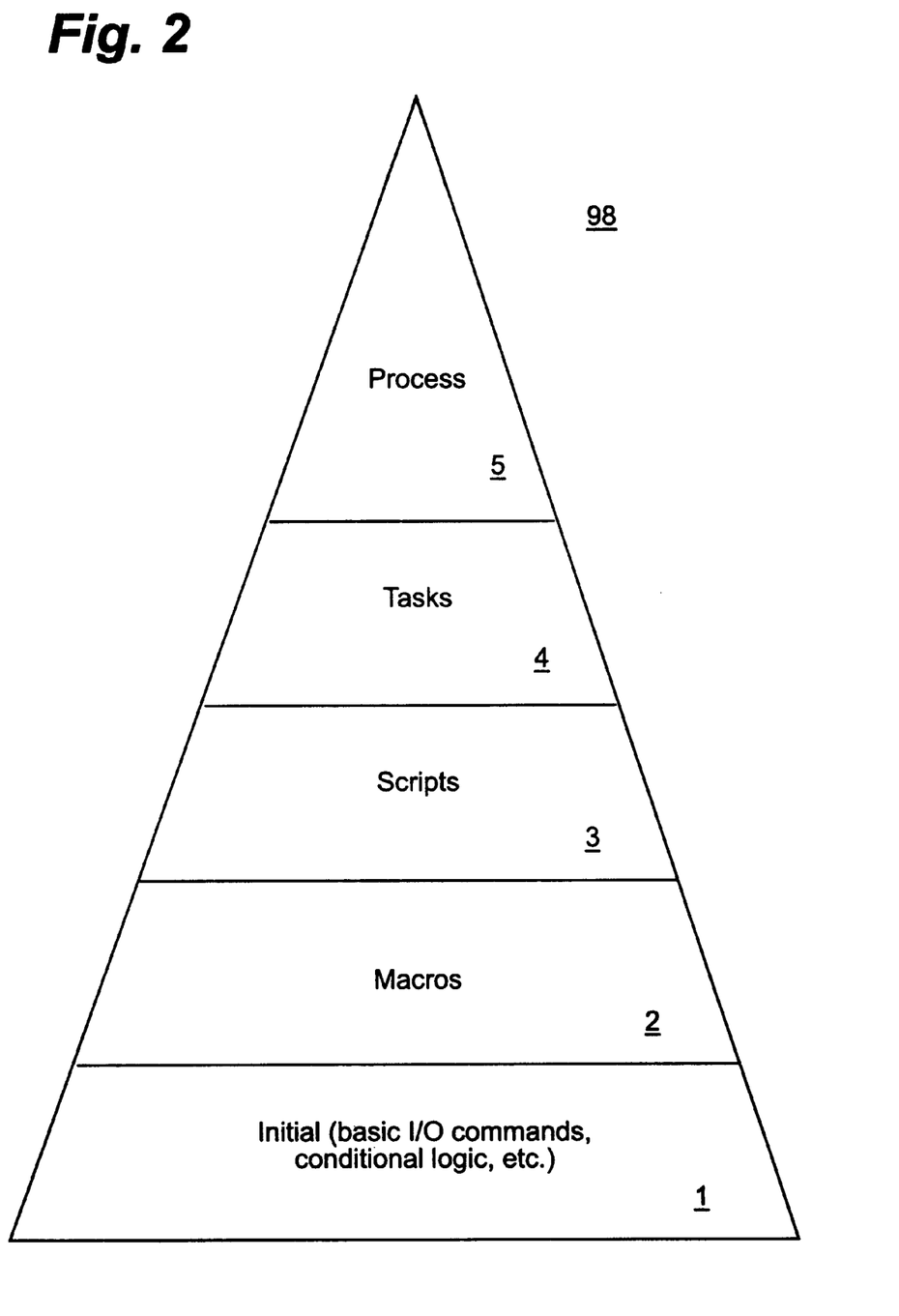
FIG. 2 is an exemplary conceptual drawing of an intuitive programming program for creating or editing a process control program.

Referring now to FIG. 2, an exemplary conceptual diagram of the intuitive programming program 98 is shown wherein the intuitive programming program 98 is comprised of five programming levels: Initial programming level 1, Macros programming level 2, Scripts programming level 3, Tasks programming level 4 and Process programming level 5. Additional or fewer programming levels may be provided depending upon the complexity of the control program 68 being created or edited. At each programming level other than level 1, commands are defined by selecting and arranging a plurality of the commands defined at the programming level below. Thus, it may be seen that at each sequentially higher programming level, the set of commands defined at the programming level below becomes smaller (as indicated conceptually in FIG. 2.)

At Initial programming level 1, the set of available commands to be inserted into the control program 68 is comprised of basic I/O commands, conditional logic commands, and other low-level programming commands. The names of these commands may have little or no meaning to the Process Programmer untrained in the art of low-level programming (i.e., the names of these commands will convey little or no indication of the command's function within the process being controlled). Thus, only the Low-Level Programmer will be involved at this level. ("Programming" at this level may actually only involve selecting a comprehensive set of basic low-level commands or even selecting the appropriate low-level language as opposed to traditional programming.)

At Macros programming level 2, Macro commands are defined by selecting and arranging a plurality of Initial programming level 1 commands. A Macro command is a relatively basic set of Initial programming level 1 commands that are combined to perform a relatively basic function within control program 68. In other words, the execution of a Macro command will involve a relatively small part of the controlled process. The name of a Macro command, however, will convey relatively more information about the function of the Macro command within the process being controlled than will the names of its constituent Initial programming level 1 commands. In other words, the Macro command's name is relatively more descriptive of its function within the controlled process.

At Scripts programming level 3, Script commands are defined by selecting and arranging a plurality of Macro commands from the set of defined Macros. A Script command is then a relatively more comprehensive set of commands than a Macro command and the execution of a Script command will involve a relatively larger part of the controlled process. The name of the Script command will convey relatively more information about the function of the Script command within the process being controlled than will the names of its constituent Macro commands.

At Tasks programming level 4, Task commands are defined by selecting and arranging a plurality of Script commands from the set of defined Scripts. A Task command is then a relatively more comprehensive set of commands than a Script command and the execution of a Task command will involve a relatively larger part of the controlled process. The name of the Task command will convey relatively more information about the function of the Task command within the process being controlled than will the names of its constituent Script commands.

Finally, at Process programming level 5, the entire Process is defined. The Process is defined by selecting and arranging a plurality of Task commands from the set of defined Task commands. At this programming level, the control program 68 has been created or finally edited. Only the Process Programmer will be involved at this level.

Thus, it may be seen that, at some programming level in the continuum described above, the names of commands may convey more meaning to the Process Programmer regarding the function of the command within the controlled process than to the Low-level Programmer. It is at this level that programming control may become the responsibility of the Process Programmer. Thus, for example, access to certain levels of the intuitive programming program 98 may be selectively allowed or denied according to the programming sophistication of the purchaser or other end user of the process control system 10 comprising the intuitive programming program 98.

5.3.2.2 Description of An Embodiment of Intuitive Programming Program

Figure 3A:
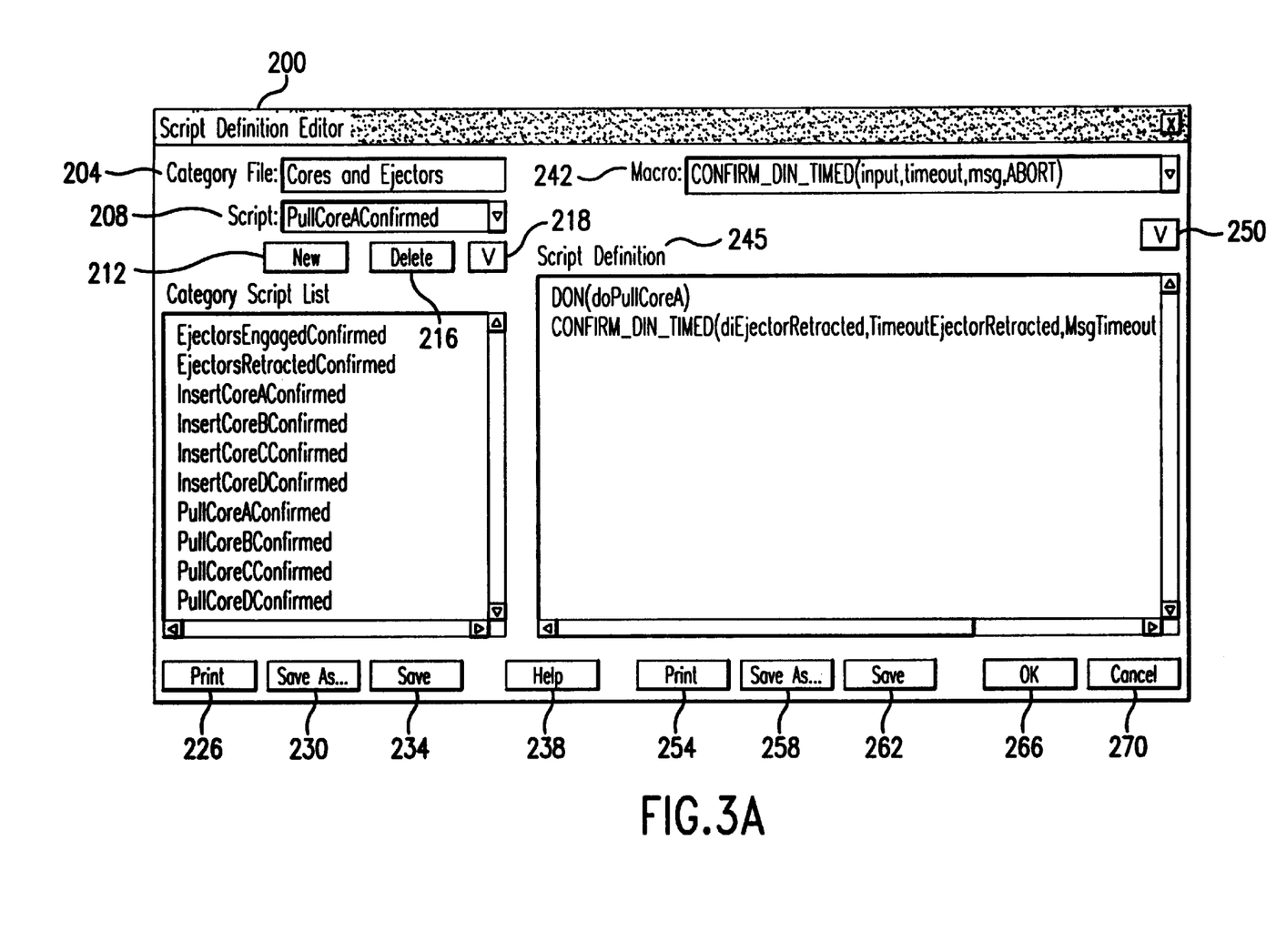
FIG. 3A shows a programmer interface window for defining a script.
Figure 3B:
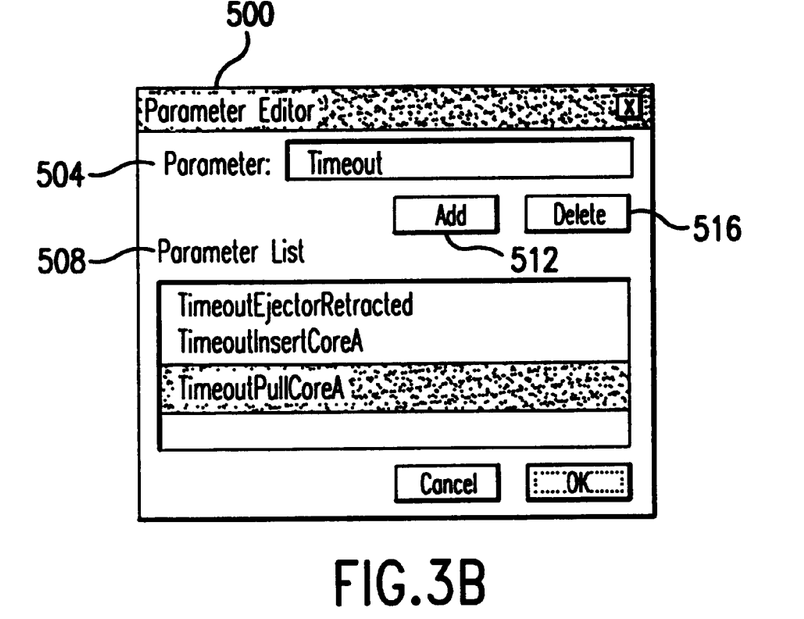
FIG. 3B shows a programmer interface window for selecting a parameter when defining a script.
Figure 4A:
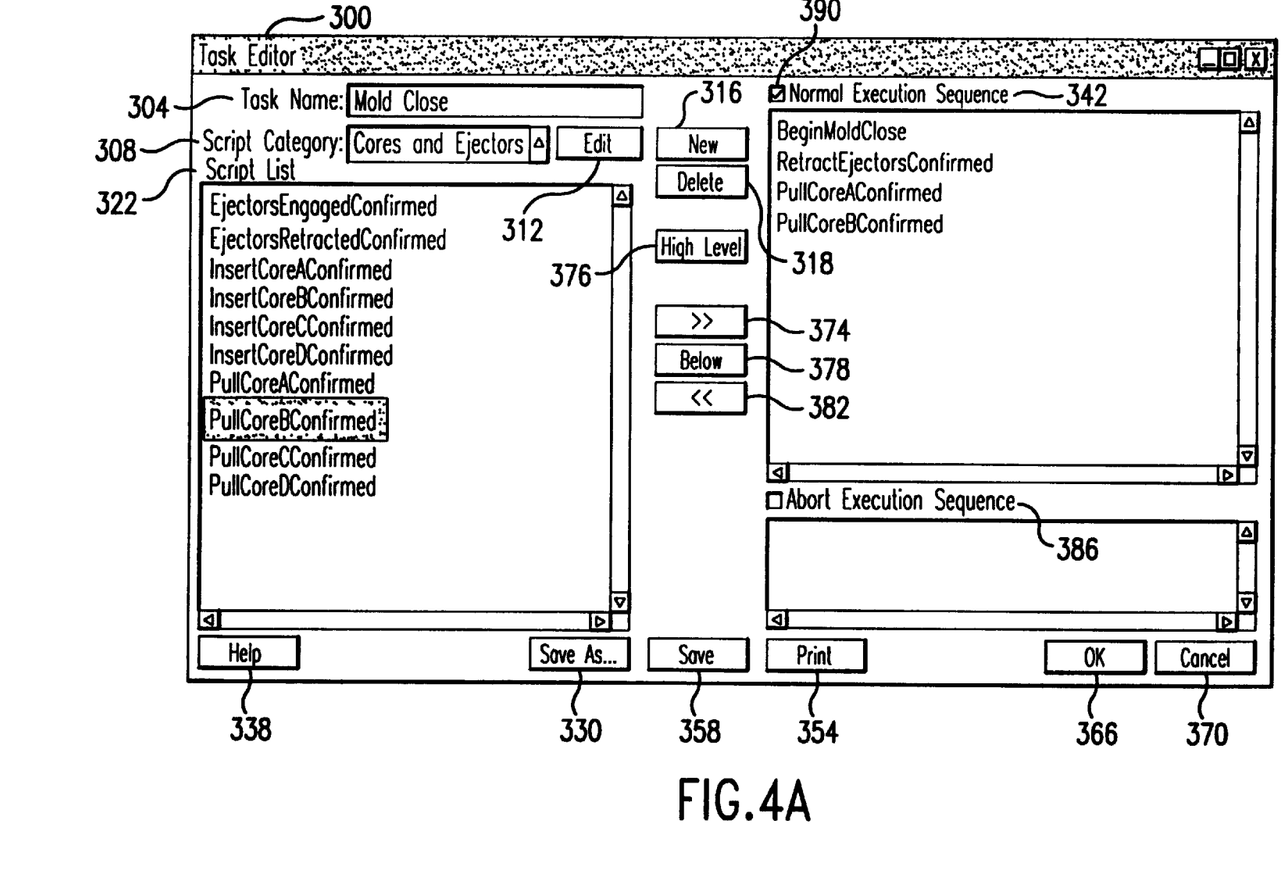
FIGS. 4A and 4B show programmer interface windows for defining a task.
Figure 4B:
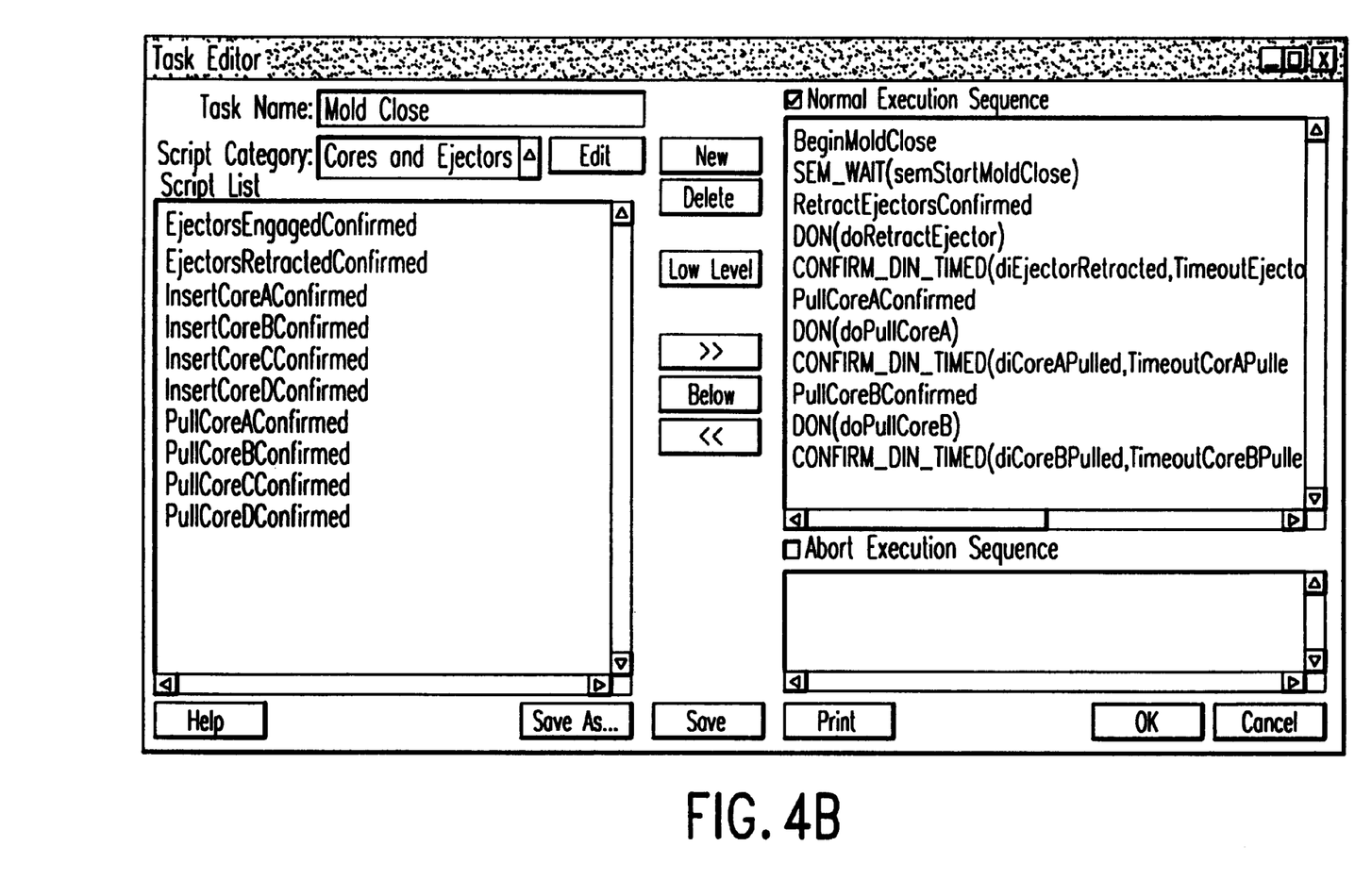
Figure 5:
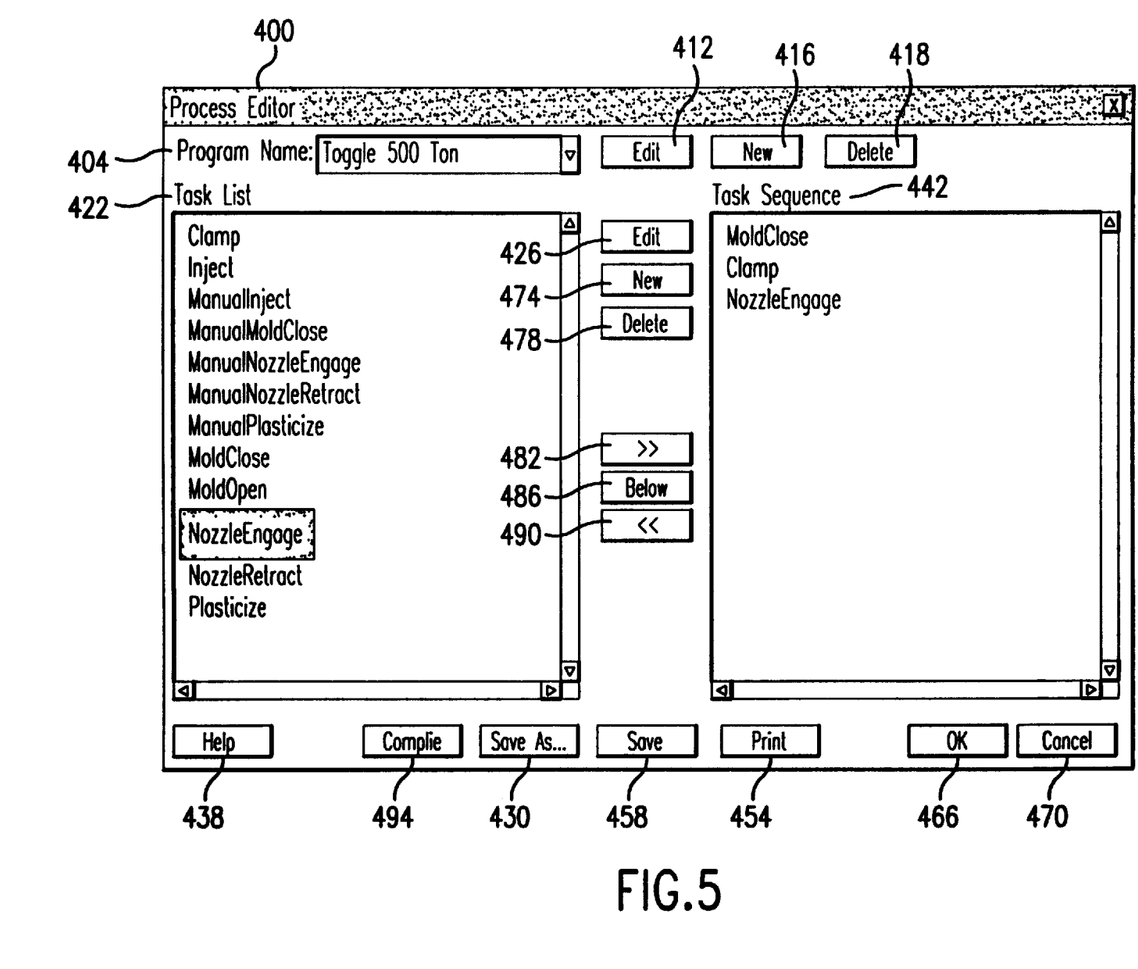
FIG. 5 shows a programmer interface window for defining a process.

Referring now to FIGS. 3–5, an exemplary embodiment of the intuitive programming program 98 is shown. In this exemplary embodiment, the intuitive programming program 98 is being utilized to create a control program 68 for controlling a plastic injection molding machine.

In this embodiment, the intuitive programming program 98 comprises three program components which correspond to three GUI windows: (1) a Script Definition Editor window 200, (2) a Task Editor window 300, and (3) a Process Editor window 400. Thus, in this embodiment, responsibility for programming control has been given to the Process Programmer at Scripts level 3. In other words, in the continuum described above, the Process Programmer is not permitted to define Macros, but is permitted to define Scripts. The level of access permitted to the Process Programmer may change depending upon the Process Programmer's experience, the complexity of the control program 68 being created, or other factors, including security issues.

5.3.2.2.1 Script Definition Editor Window

As shown in FIG. 3A, the Script Definition Editor window 200 comprises a Category File box 204, a Script box 208, a Category Script List box 222, a Macro box 242, and a Script Definition box 246. The Script Definition Editor window 200 also comprises a plurality of user input buttons (e.g., Print button 226).

The Script Definition Editor window 200 enables a user (e.g., the Process Programmer or Low-level Programmer) to edit, create or delete a Script. When editing an existing Script, the user may first select the category in which the Script is contained in the Category File box 204. For example in FIG. 2A, the category file "Cores and Ejectors" has been selected. A category file comprises a plurality of selectable Scripts. Additionally, Scripts may be contained in more than one category file.

Selection of a Category File causes all existing Scripts within the Category File to be displayed in the Category Script List box 222. The user may then select the Script to be edited from Category Script List box 222 using conventional GUI techniques (e.g., double clicking a mouse controlling a properly situated screen pointer). The desired Script may also be selected from Script box 208 which comprises a selectable drop-down list. In the example shown in FIG. 3A, the Script selected for editing is "Pull Core A Confirmed."

When the desired Script has been selected in Script box 208, the Macros comprising the Script are displayed in the Script Definition box 246. For example, in FIG. 3A, the selected Script is comprised of two Macros, DON and CONFIRM_DIN_TIMED, and parameters associated with these Scripts.

The user may now delete a Macro from the Script Definition box 246 (i.e., from the selected Script) using conventional GUI techniques. The user may also insert a Macro into the Script Definition box 246 by selecting one or more previously defined Macros from Macro box 242, which comprises a drop-down list displaying all the Macros available. The desired Macro from Macro box 242 may be inserted into the desired position in the Script Definition box 246 by pushing the V button 250.

The syntax of some Macro commands may require that certain parameters be included in the Macro command. Thus, referring now to FIG. 3B, a Parameter Editor window 500 is shown that allows the user to include certain parameters with the selected Macro. The Parameter Editor box 500 is automatically invoked by the intuitive programming program 98 whenever a Macro requiring parameters is selected.

The Parameter Editor window 500 comprises a Parameter box 504 and a Parameter List box 508. The Parameter box 504 allows the user to select the type of parameter to be included with the Macro. For example, in the exemplary embodiment shown in FIG. 3B, the user may select timeout parameters, message parameters, or process parameters to be included with the Macro. When the type of parameter is selected in Parameter box 504, all the parameters of that type are displayed in a Parameter List box 508. The specific parameter may then be selected by pushing Add button 512. Parameters may be deleted by pushing Delete button 516.

Referring again to FIG. 3A, a new Script may be created in much the same way as an existing Script is edited. The user may push the New button 212 to begin creating a new Script. The user may then type the name of the new Script in the Script box 208, and define the Script using the Macro box 242, Script definition box 246 and Parameter editor box 500 as described above.

The Script Definition Editor window 200 has several other GUI features. Print buttons 226 and 254, Save As buttons 230 and 258 and Save buttons 234 and 262 allow the user to print, save or save as a different name, the file being modified. The Help button 238 invokes system help features. The OK button 266 may be used as an optional GUI selection means. The Cancel button 270 cancels a GUI selection. A variety of other GUI features may also be provided depending upon the operating system.

It should be noted that in the exemplary embodiment of FIG. 3A, which relates to the programming of a control program 68 for controlling a plastic injection molding process, the Script names are relatively more descriptive of elements of the plastic injection molding process than the Macros. For example, the Script name "Ejectors Engaged Confirmed" may convey more meaning as to the Script command's function within the controlled process that the Macro names "DON" or "CONFIRM_DIN_TIMED".

5.3.2.2.2 Task Editor Window

Referring now to FIGS. 4A and 4B, the Task Editor window 300 enables the user to edit and define Tasks in a manner similar to that used to edit and define Scripts.

For example, in FIG. 4A, the Task being edited is "Mold Close" as shown in Task Name box 304. The Scripts comprising the Task "Mold Close" are shown in the Normal Execution Sequence box 342 (e.g., "Begin Mold Close", "Retract Ejectors Confirmed", etc.). The Scripts that may be inserted into the Task are displayed in the Script List box 322 which correspond to the selected category in the Script Category box 308. Scripts may be inserted into the Task by highlighting the desired Script in List box 322 and pushing the >> button 374 or by other conventional GUI techniques. Similarly Scripts may be deleted from the Task by selecting the Script to be deleted in the Normal Execution Sequence box 342 and pushing the << button 382.

The Task Editor window 300 has several other features not discussed above with reference to the Script Definition Editor window 200. These features may, however, be provided in any of the GUI windows comprising the present invention. As shown in FIGS. 4A and 4B, by toggling button 326 between "High Level" and "Low Level", the Task Editor window 300 may display either (1) the Scripts comprising a Task or (2) the Scripts comprising a Task and the Scripts' constituent Macros. Additionally, by using check box 390, a task can be defined as having two functions; (1) a first function for normal operation of the controlled process and (2) a second function for an aborted operation of the controlled process. Thus, for example, when creating a control program 68 for a plastic injection molding machine, Tasks can be created for normal operation of the plastic injection molding machine and for situations in which operation of the plastic injection molding machine must be aborted (e.g., leaks in the mold cavity, high pressures in the mold cavity, or various mechanical failures).

5.3.2.2.3 Process Editor Window

Referring now to FIG. 5, the Process Editor window 400 enables the user to edit and define Processes in a manner similar to that used to edit and define Scripts and Tasks. The Process Editor window 400 may have all of the features of the Script Definition Editor window 200 and the Task Editor window 300. The entire process to be controlled by the processor-based control system 10 is defined in the Process Editor window 400.

For example, in FIG. 5, the partially defined process "Toggle 500 Ton" is currently comprised of Tasks "Mold Close", "Clamp", and "Nozzle Engage". Additional Tasks may be added to the process by selecting a Task in the Task List box 422 and pushing the >> button 482.

When the Process has been completely defined, the Process command comprises all of the commands that will be in the control program 68. The Process file may be compiled by pushing Compile button 494. A compiled Process file may then be downloaded into the main memory 66 of control computer 60 where it is stored as control program 68 for execution by processor 70.

5.3.3 Miscellaneous

It will be apparent to those skilled in the art that variations of these embodiments and principles can be made without departing from the principles and spirit of the invention. For example, in an embodiment, all of the files created by the intuitive programming program 98 may be encrypted. Additionally, the text of the GUI windows of the intuitive programming program 98 may be a variety of languages other than English. Accordingly, it is intended that the scope of the invention be only limited as necessitated by the accompanying claims.

What is claimed is:

1. A processor-based process control system for a plastic injection molding machine performing a plastic injection molding process, comprising:
   (a) an I/O bus network having a plurality of I/O modules operably connected to a corresponding I/O device associated with the plastic injection molding machine;
   (b) a first computer comprising:
      (1) an I/O bus controller directly connected to the I/O bus network;
      (2) a real-time operating system; and
      (3) a first processor executing a plastic injection molding control program for controlling the plastic injection molding process; and
   (c) a second computer comprising:
      (1) an application-specific program configured to operate with the plastic injection molding control program for allowing an operator to view parameters related to the plastic injection molding process and input information related to the plastic injection molding process; and
      (2) a second processor for executing the application-specific program.

2. The processor-based process control system of claim 1 wherein the second computer further comprises storage for storing information relating to the plastic injection molding process.

3. The processor-based process control system of claim 1 wherein the first computer further comprises a first interface and the second computer further comprises a second interface, and wherein the first and second interface are communicatingly linked.

4. The processor-based process control system of claim 1 wherein the second computer is operably connected via a network to a third computer such that the third computer is capable of viewing parameters related to the plastic injection molding process and capable of inputting information related to the plastic injection molding process.

5. The processor-based control system of claim 4 wherein the third computer comprises the application-specific program.

6. A processor-based process control system for a plastic injection molding machine performing a plastic injection molding process comprising:
   (a) an I/O bus network having a plurality of I/O modules operably connected to a corresponding I/O device associated with the plastic injection molding machine;
   (b) a first computer comprising:
      (1) an I/O bus controller directly connected to the I/O bus network;
      (2) a real-time operating system; and
      (3) a first processor executing a plastic injection molding control program for controlling the plastic injection molding process; and
   (c) a second computer comprising:
      (1) an application-specific program configured to operate with the plastic injection molding control program for allowing an operator to view parameters related to the plastic injection molding process and input information related to the plastic injection molding process;
      (2) a second processor for executing the application-specific program;
      (3) a hierarchy of programming levels, including an N programming level and an N+1 programming level, wherein N is a positive integer;
      (4) a defined set of N programming level commands; and
      (5) a GUI window for defining N+1 programming level commands by enabling a user to select and arrange a plurality of defined N programming level commands.

7. The processor-based control system of claim 6, wherein the GUI window enables a user to define an N+1 programming level command such that the N+1 programming level command has two functions.

8. The processor-based control system of claim 7, wherein the two functions correspond to the normal operation of the plastic injection molding machine and an aborted operation of the plastic injection molding machine.

9. The processor-based process control system of claim 6 wherein the second computer further comprises a GUI window for each programming level other than the first programming level, and wherein the program for creating the plastic injection molding control program is configurable such that the user cannot gain access to a subset of the GUI windows.

10. The processor-based control system of claim 9, wherein a command defined in the GUI window for the highest programming level comprises all of the first programming level commands in the plastic injection molding control program.

11. A processor-based process control system for a plastic injection molding machine performing a plastic injection molding process comprising:
   (a) an I/O bus network having a plurality of I/O modules operably connected to a corresponding I/O device associated with the plastic injection molding machine;
   (b) a first computer comprising:
      (1) an I/O bus controller directly connected to the I/O bus network;
      (2) a real-time operating system; and
      (3) a first processor executing a plastic injection molding control program for controlling the plastic injection molding process;
   (c) a second computer comprising:
      (1) an application-specific program configured to operate with the plastic injection molding control program for allowing an operator to view parameters related to the plastic injection molding process and input information related to the plastic injection molding process; and
      (2) a second processor for executing the application-specific program; and
   (d) a third computer, operably connected via a network to the second computer, capable of viewing and inputting parameters related to the plastic injection molding process and further comprising an application specific program for creating the plastic injection molding control program, comprising:
- (a) a hierarchy of programming levels, including an N programming level and an N+1 programming level, wherein N is a positive integer;
- (b) a defined set of N programming level commands; and
- (c) a GUI window for defining N+1 programming level commands by enabling a user to select and arrange a plurality of defined N programming level commands.

12. A processor-based process control system for a plastic injection molding machine, comprising:
- (a) an I/O bus network having a plurality of I/O modules operably connected to a corresponding I/O device associated with the plastic injection molding machine;
- (b) a first computer comprising:
  - (1) an I/O bus controller directly connected to the I/O bus network;
  - (2) a real-time operating system; and
  - (3) a first processor executing a plastic injection molding control program for controlling the plastic injection molding process;
- (c) a second computer comprising:
  - (1) an application-specific program configured to operate with the plastic injection molding control program for allowing an operator to view parameters related to the plastic injection molding process and input information related to the plastic injection molding process;
  - (2) a second processor for executing the application-specific program; and
- (d) a stand-alone computer comprising a program for creating the plastic injection molding control program, comprising:
  - (1) a hierarchy of programming levels, including an N programming level and an N+1 programming level, wherein N is a positive integer;
  - (2) a defined set of N programming level commands; and
  - (3) a GUI window for defining N+1 programming level commands by enabling a user to select and arrange a plurality of defined N programming level commands.

* * * * *